March 16, 1965 J. B. TIEDEMANN 3,173,514
IMPACT VIBRATION DAMPER
Filed Oct. 4, 1961 2 Sheets-Sheet 1

INVENTOR.
JAMES B. TIEDEMANN
BY Ooms, McDougall
and Hersh
ATT'YS.

United States Patent Office 3,173,514
Patented Mar. 16, 1965

3,173,514
IMPACT VIBRATION DAMPER
James B. Tiedemann, Lawrence, Kans., assignor to The Kansas University Endowment Association, Lawrence, Kans., a corporation of Kansas
Filed Oct. 4, 1961, Ser. No. 142,883
3 Claims. (Cl. 188—1)

This invention relates to an impact vibration damper of a type suitable for reducing or eliminating vibrations in objects subject to such conditions. It is well known that various power driven mechanisms are subject to forces during their operation which cause the mechanisms to vibrate in regular or irregular patterns. It is equally well known that such vibrations can result in a decrease in the operational efficiency of the mechanisms and, in many cases, the vibrations can cause severe damage and failures in the mechanisms or in associated parts.

Vibration dampers generally relate to devices which when fastened to vibrating bodies without any other rigid connection will reduce the vibration of the body to which they are attached. Known vibration dampers are generally divided into two main classes: energy-absorbing devices and reactive-force devices.

The energy-absorbing type of damper has been developed and used with considerable success. The greatest advantage of these devices is their simplicity and, even though they are not capable of completely eliminating vibration in operating mechanisms, they are generally suitable for reducing extreme vibrations. Typical examples of this type of damper are automobile crankshaft dampers and sliding friction in leaf springs. In addition to the fact that they will never completely eliminate vibrations, this type of damper additionally suffers from the disadvantage of creating heat in its operation.

The reactive-force class of damper is typified by the dynamic vibration absorber in which a small auxiliary mass, vibrating at a large amplitude, generates a reactive force that cancels out the exciting or vibrating force. The major advantages of this device include the fact that it can completely stop the motion of the body whose vibration is to be controlled and, furthermore, these devices do not generate heat in operation. An unfortunate disadvantage of this type of damper results from the fact that the vibration absorber must be exactly tuned to the frequency of the exciting force. If the vibration absorber is operated at a frequency other than that for which it is intended, it will, in many cases, be worse than useless, since it may introduce two resonant frequencies where only one existed without it. Such devices are, therefore, only applicable on constant speed machinery or in applications such as in the centrifugal pendulum balancers used in aircraft engine crankshafts, where a variable stiffness spring can be employed.

Impact vibration dampers with which this application is particularly concerned can be designed to possess some of the characteristics of each of the above described classes. However, as will be apparent, the devices are preferably constructed as a reactive-force type device with energy dissipation being held to a minimum. The great advantage of the impact vibration dampers resides in the fact that they are not sensitive to frequency and will give optimum performance over a wide range of frequencies without adjustment. Known devices of this type, however, have been unacceptable for the reason that they ordinarily generate an extremely unpleasant noise level and, therefore, are subject to production of vibrations at a large number of harmonics of the exciting force. Known impact vibration dampers generally consist of a cylinder adapted for attachment to a vibrating body. The cylinder contains a steel ball which is free to move through a certain clearance distance within the cylinder. The ends of the cylinder are resilient whereby the ball can rebound from the ends with only a slight dissipation of energy. After attachment of the cylinder to a vibrating body, the steel ball therein is capable of rebounding in such a manner that an impulse wave approximately 180° out of phase with the exciting force can be generated. Since the hardened steel ball impacting against the end of a steel cylinder represents a very sharp impulse wave, a large number of harmonics are present and an objectionable noise level is created along with a distinct possibility of harmonic resonance.

It is, therefore, an object of this invention to provide a vibration damper of a design which departs materially from prior known types and damper constructions.

It is a further object of this invention to provide an improved impact vibration damper which is essentially frequency insensitive and which is not subject to noise and high harmonic conditions which interfere with proper operation of the device.

These and other objects of this invention will hereinafter appear, and for purposes of illustration, but not of limitation, specific embodiments of this invention are shown in the accompanying drawings in which.

The impact vibration dampers of this invention are generally characterized by a casing which contains the operative parts of the damper and which is adapted for attachment to a body subject to vibrations. A piston of a relatively high mass is slidably fitted within the casing along with a gas or other compressible fluid maintained at a predetermined pressure. The piston, which comprises the reactive mass of the damper, is provided with passage means whereby the gas within the casing may be displaced therethrough.

In the damper construction, valve means are positioned on either side of the piston in spaced apart relation with respect to the end walls of the casing. The valve means are adapted to close off the passage at the respective ends of the piston when the piston slides within the casing toward one or the other of the valve means.

The sliding movement of the piston into contact with the valve means creates a sealed gas chamber at the end of the casing and this chamber provides a cushioning means for the piston. It will be apparent that the piston will rebound before reaching the ends of the casing as the pressure builds up in the sealed ends.

In order to implement the dampers of this invention for use under varying conditions, means are preferably provided for changing the gas pressure within the casing. Furthermore, means are provided by which the distance between the close off points of the damper valves may be altered, either by replacing the means containing the valve ports with one better suited to the operating conditions, or by causing the position of the slot or port defining this distance to be altered by some self-contained mechanism as described in the copending declaration entitled "Impact Damper and Control Means Therefor." It has been found that adjustment of the motion of the piston which comprises the reactive mass within the casing will permit use of the apparatus at different amplitudes of vibration. Piston motion may be changed either by means of varying the distance between the valves, which determines the position at which the valve means seal off the casing ends, or by changing the gas pressure, which permits the piston to move varying distances in compressing the gas in the sealed casing end before rebounding.

Figure 1:
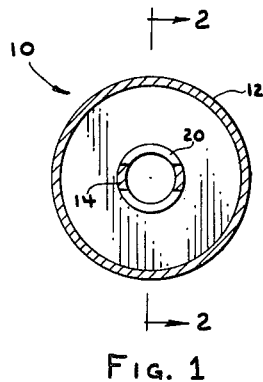
FIGURE 1 is a sectional view of an impact vibration damper possessing the characteristics of this invention taken about the line 1—1 of FIGURE 2.

Attention may be given to the accompanying drawings and the following description for a more detailed explanation of the invention. FIGURE 1 illustrates a damper 10 which is characterized by the features of this invention. The damper is illustrated as composed of cylindrical parts, which is the simplest design from the manufacturing standpoint. However, it will be apparent that other geometrical configurations are feasible. The damper can be provided with any suitable means for fastening to a body 11 (FIGURE 2) which is subject to vibrations.

The damper 10 comprises a cylindrical gas-tight casing 12 having a centrally disposed tube-like extension 14 passing therethrough. A piston 16 is fitted within the casing 12 and around tube 14 in a gas-tight, slidable manner. The piston shown is comprised of an annular body having a central opening through which the tube 14 passes.

Figure 4:
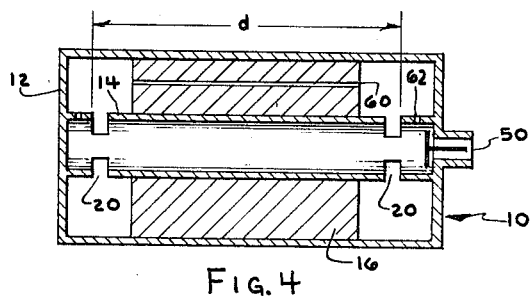
FIGURE 4 is a cross-sectional view of a modified damper illustrating valve adjusting and gas pressurizing means therefor.

A pair of ports 20 positioned on either side of piston 16 forms the valve means. As shown in FIGURE 4, the ports which comprise the valve means of this mechanism have close off points separated by the distance "$d$."

Figure 2:
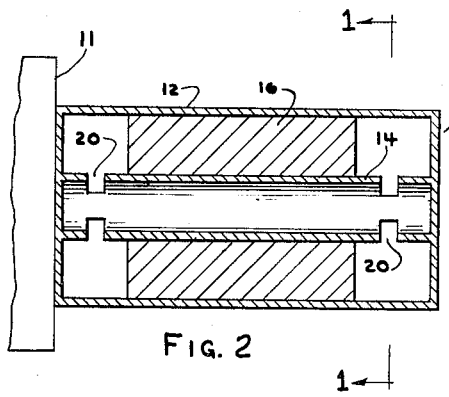
FIGURE 2 is a cross-sectional view taken about the line 2—2 of FIGURE 1.
Figure 3:
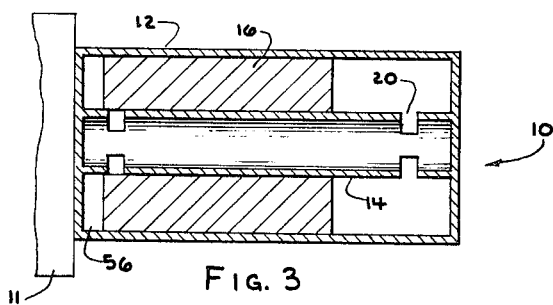
FIGURE 3 is a cross-sectional view of a damper as shown in FIGURE 1 illustrating the damper casing and reacting mass in a vibratory motion arresting position.

In operation of the damper reference is made in particular to FIGURES 2 and 3. In FIGURE 2 the damper is shown with the piston 16 disposed midway between the ports 20, permitting free passage of fluid between the ends of the casing through the central passage in tube 14. In FIGURE 3 piston 16 has moved to the left end of the casing, closing one of the points 20 and forming a sealed chamber 56 at the left end of casing 12. Further motion of the piston 16 toward the left will compress the gas trapped in sealed end 56 of casing 12, and the resulting pressure will arrest the motion of piston 16 and cause it to rebound toward the opposite end of casing 12. The reaction of this pressure against the sealed end of casing 12 is transmitted to the vibrating body 11 through a suitable rigid mechanical connection. It has been shown mathematically and vertified experimentally that under suitable design and operating conditions the pressures against the ends of casing 12 oppose the external disturbance causing the body 11 to vibrate, and beneficially reduce or damp the amplitude of vibration of body 11.

Specific embodiments of constructions which have been manufactured in accordance with the above principles include the use of a cylindrical brass piston weighing 0.19 pound. The piston was received within a transparent plastic block casing closed at each end by steel plates and gaskets. Air at atmospheric pressure was used as the working fluid, and two fixed ports were drilled into the chamber in order to form a gas valve system. Valve ports such as shown at 20 were positioned within the casing in a manner such that the piston was permitted ¼ inch of free travel, after which it covered one of the ports and "bounced" by compressing the air trapped in the end of the casing. The total weight of the suspended system, excluding the piston, was 2.37 pounds, giving a mass-ratio of 0.080.

Figure 5:
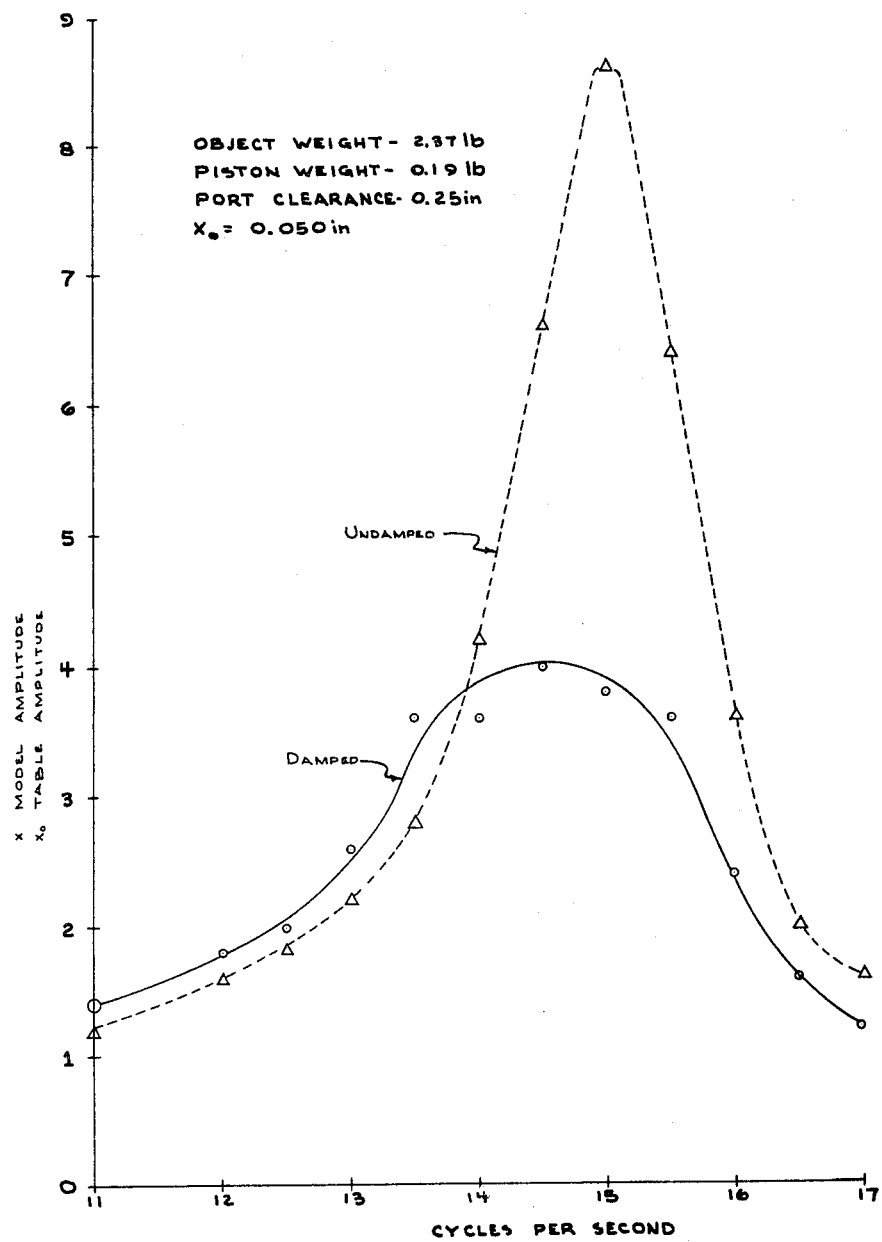
FIGURE 5 is a graph illustrating the vibration reduction effect of the impact vibration dampers of this invention.

FIGURE 5 illustrates a typical performance curve of this model and the reduction in vibratory movement of the damped system as compared to the undamped system is apparent. An additional conspicuous effect of the described device was its silent operation, and the general smoothness of the action suggested that the higher harmonic response of the system had been drastically reduced. Observation of the piston motion by Strobotac illumination through the transparent chamber showed that the impacts of the piston with respect to the valves occurred near the extremes of the chamber motion as expected after mathematical analysis of the system. The mathematical procedure is described in detail in applicant's report entitled Impact Vibration Dampers, University of Kansas Aeronautical Laboratory, ONR Contact 2415-00, June 26, 1961.

A further embodiment, constructed in accordance with the above design, was constructed using a steel casing charged with compressed air to increase the hardness of the impact. The piston employed weighed .58 pound, and the vibrating mass, including the damper mechanism, exclusive of the piston, weighed 2.68 pounds, giving a mass-ratio of 0.216.

FIGURE 4 illustrates schematically a valve 50 provided whereby the pressure within the casing can be changed at will. In addition to pressure buildup within the casing, in some instances it has been found desirable to provide for some viscous damping of the piston means in order to stabilize the action of the damper. For this purpose, a small bore 60 can be provided in the piston (FIGURE 4), and the fluid within the casing will thus have a small bleed passage whereby sudden build up of pressure in the sealed ends 56 will be avoided. As an alternative, a bore 62 could be formed in the tubular member 14 for achieving the same results. It will be apparent that other factors, such as friction between the piston and casing, and air leaks resulting from a less than perfect fit between these parts, will provide similar results.

It has been established mathematically that for optimum results the piston clearance (distance "$d$") should increase linearly with the amplitude of the disturbing force causing body 11 to vibrate, and mechanical experiments and analog computer studies show that a free piston travel approximately equal to the response amplitude of vibrating body 11 with the damper attached will also give results close to optimum performance. The compressible-fluid damper herein described is especially amenable to automatic adjustment by a self-contained amplitude-sensing device, for the large forces exerted by the piston in rebounding from the ends of the chamber are resisted by the fixed chamber ends rather than by the valve means that provide this adjustment.

The pressure within the casing may also be adjusted to adapt the damper to its operating conditions. It has been found experimentally that high chamber pressures cause the damper to be insensitive to frequency but require adjustment of the valve means to suit the disturbance amplitude, while low chamber pressures make the amplitude adjustment less critical at the expense of some frequency sensitivity.

The invention has been described with reference to the use of gas, particularly air, as the compressible fluid within the damper casing. It is contemplated that other gases, or liquids with or without the use of elastic reservoirs or other means to enhance their compressibility, could be employed to exhibit the compressible characteristics suitable for the disclosed system.

It will be understood that various modifications may be made in the above described apparatus which provide the characteristics of this invention without departing from the spirit thereof, particularly as defined in the following claims.

I claim:

1. A vibration damper comprising a gas-tight cylindrical casing adapted for attachment to a body, a tubular member defining an internal passage centrally disposed within said casing, an annular piston of relatively high mass having its outer wall fitted in gas-tight, slideable relation with the inner wall of said casing and having its inner wall fitted in gas-tight slideable relation on said tubular member, said piston being free of mechanical attachment with said casing, valve openings defined in said tubular member near each end thereof, said openings being spaced from the end walls of said casing and adapted to be closed off by said piston whereby sealed chambers can be formed at either end of said casing, and a compressible fluid included within the casing whereby movement of said piston to close off valve openings at one end of said tubular member results in compression of said fluid within the associated chamber.

2. A vibration damper according to claim 1 including means for adjusting the fluid pressure within said casing.

3. A vibration damper in accordance with claim 2 wherein the means for adjusting the fluid pressure includes a channel formed in said tubular member leading to the interior of said casing and sealing means for closing said channel.

References Cited in the file of this patent
UNITED STATES PATENTS

| | | |
|---|---|---|
| 2,819,775 | Everett | Jan. 14, 1958 |
| 2,854,100 | Bowser et al. | Sept. 30, 1958 |